United States Patent [19]

Couch et al.

[11] Patent Number: 4,752,876
[45] Date of Patent: Jun. 21, 1988

[54] SELF SERVICE TERMINAL FOR LODGING INDUSTRY INCLUDING ROOM KEY DISPENSER

[75] Inventors: Wilfred R. Couch, Lake Wylie, S.C.; Russell G. Burgess, Charlotte, N.C.

[73] Assignee: International Business Machines Corporation, Armonk, N.Y.

[21] Appl. No.: 744,867

[22] Filed: Jun. 14, 1985

[51] Int. Cl.$^4$ .......................... G06G 7/48; G06F 7/04
[52] U.S. Cl. ............................ 364/407; 340/825.28; 235/381; 364/479; 364/400
[58] Field of Search .............. 364/407, 400, 478, 479; 235/380, 381, 382; 340/825.28, 825.31, 825.35

[56] References Cited

U.S. PATENT DOCUMENTS

| | | | |
|---|---|---|---|
| 3,656,113 | 4/1972 | Lince | 221/39.2 X |
| 3,742,141 | 6/1973 | Duncan et al. | 179/2 A |
| 3,742,453 | 6/1973 | Poylo | 340/149 A |
| 3,781,805 | 12/1973 | O'Neal, Jr. | 235/382 |
| 3,797,009 | 3/1974 | Crudgington, Jr. | 340/286 R |
| 3,955,725 | 3/1976 | Rese | 224/194 |
| 4,010,868 | 3/1977 | Rese et al. | 221/9 |
| 4,072,825 | 2/1978 | McLay et al. | 340/310 R X |
| 4,371,070 | 2/1983 | Maxwell | 221/66 X |

OTHER PUBLICATIONS

NCR 1810 General Purpose Self-Service Terminal SP-985 0582.
NCR 1810 Self-Service Terminal for the lodging industry SP-1020-01 1183.
Trademark Registration 1,394,673 May 27, 1986.
Trademark Registration 1,330,642 Apr. 16, 1985.
1985 Sheraton ® Centre Hotel Guest Services Directory pp. 1 and 2 and Saflok ® card (undated).

Primary Examiner—Jerry Smith
Assistant Examiner—Charles B. Meyer
Attorney, Agent, or Firm—Karl O. Hesse; Kenneth A. Seaman

[57] ABSTRACT

A self service terminal for a lodging facility includes room key dispensing and receiving. The present invention allows a guest to automatically check into a lodging facility, have an appropriate room assigned to him in accordance with his request and obtain a key for a room without the intervention of employees of the lodging facility. The invention also includes an apparatus and method for allowing a guest of a lodging facility to check out at the self service terminal upon departure intervention by employees of the lodging facility, with the self service terminal recovering the room key which the guest had been using.

11 Claims, 9 Drawing Sheets

SELF SERVICE TERMINAL FOR LODGING INDUSTRY INCLUDING ROOM KEY DISPENSER

BACKGROUND OF THE INVENTION

1. Field of the Invention

The present invention relates to a self service terminal for use in the lodging industry. More particularly, the present invention is an apparatus and a method of checking guests into and out of a lodging facility advantageously including the dispensing of an appropriate room key upon check-in, automatic, that is, without the necessity for intervention by employees of the lodging facility during routine transactions.

2. Prior Art

In a lodging environment, customer transaction handling and room assignment is a time consuming routine involving many decisions and much information handling. Rooms are not fungible goods for many reasons. First, a guest must be provided with a particular room and the associated key for his exclusive use while the lodging facility has a record of which room is assigned to that particular guest so that it may handle his bills, mail and phone calls. Further, since various rooms may have differing functional and/or aesthetic difference, such as furnishings, quality, or charge rates, a mechanism must exist for selecting among the various types of rooms and assigning a guest to the proper room type. It is well known that hotels might have rooms with single beds, room with double beds, suites, and/or premium location rooms such as ocean-side, pool-side, or executive floor rooms, all of which might have differing availability or daily charge rates. Because of this variation, employees of a lodging facility had traditionally manually selected an appropriate room type and located the key associated with the room. This manual process of registering a guest and providing him his key is labor-intensive and error-prone.

In the environment of a lodging facility, a customer checking in requires the specific key unique to the room to which he is assigned. That room number must be associated with his name to facilitate phone calls, room charges, mail delivery and visitors. There is no indication that any automated apparatus has been suggested heretofore, which accomplishes in a lodging environment, the automatic supply of keys to incoming guests and the recovery of keys from departing guests.

Thus, it will be seen that the operation of a lodging facility is quite complex and has historically required significant amount of labor to select and assign rooms and dispense a key associated with the type of room assigned and recover the key at check out. These labor requirements are aggravated by widely varying numbers of personnel requiring service during the course of a day. Many people will check out during 7-9 a.m. and many will check in during 5-9 p.m., while few people will be doing either during the intermediate period.

The operation of a lodging facility has also historically required personnel to handle transactions when a guest checks out of the facility. A statement of the guest's account must be located and presented to the guest to determine his acceptance of it, a printed copy of the statement must be provided to the guest and his key collected during his checkout procedure. This has again requires employee labor, with its disadvantages including costs.

It has been suggested that a self service terminal patterned after an automatic teller machines the banking industry might be used to accomplish some of the front desk operations in a lodging facility. In a brochure entitled, "NCR 1810 Self Service Terminal for the Lodging Industry" a system is proposed for semi-automatic guest check-in and check-out which uses a credit card for identification and prints a registration form upon check-in and a guest folio (or statement) upon check-out. However, this system requires that the lodging guest use both the self service terminal for the registration and separately acquire his key from an employee at another location, as by showing the registration form to the hotel personnel at the front desk to obtain the appropriate key upon check-in. The system described in the brochure also does not address collecting a key from a departing guest, leading to the loss of hotel keys and the additional attendant expenses, labor and security risk associated involved with lost keys. This system also presumes that the hotel personnel at the front desk can locate the key to the room assigned by the terminal to a given guest when the guest has obtained a room assigned by the terminal.

Self service terminals presently provide some automated capabilities in certain limited applications, most particularly, in the banking field for handling of routine financial transactions without the assistance of bank personnel. These terminals, which are perhaps better known as automatic teller machines or ATM's, have the capability of reading information from a credit card with a magnetic stripe, reacting interactively with a user to determine the transaction he wishes to accomplish, and either accepting a deposit from the customer, or dispensing cash to the customer. Some ATM's also accommodate an appropriate transfer of funds from one customer account to another or facilitate other transactions such as making a loan payment from the customer's account. In dispensing money to a customer, the apparatus is dispensing essentially fungible goods, in that each $20 bill has an equal value and it matters not which $20 bill a particular customer receives, nor does the bank need to know which $20 bill has been disbursed to which customer.

Accordingly, the prior art systems for handling the checking in and checking out of lodging guests at a lodging facility, require personnel to address the "key" issues and are not automatic nor labor-free. Accordingly, such prior art systems have significant disadvantages and limitations.

SUMMARY OF THE INVENTION

The present invention overcomes the limitations and disadvantages of the prior art systems in a lodging facility for registering an in-coming guest and checking a departing guest out by providing a self service terminal adapted to the lodging industry, which includes an apparatus for dispensing a room key when a guest "checks-in" using the terminal.

The self service terminal for the lodging industry as contemplated by the present invention advantageously includes a plurality of stores of keys, each store capable of having a plurality of keys included therein of a common type (e.g. "double room" keys) in an ordered relationship. A central processor includes information, such as a room number associated with each key in the ordered queue, and logic to determine which store of keys should be selected for a given guest's requirements, in response either to his reservation or to his responses to inquiries from the terminal during his registration. In a short time at the terminal, an arriving guest may be identified, his credit checked if desired, his reservation located and confirmed, a room assigned as registration confirmation printed and his key provided to him. All of these steps may be accomplished by the terminal and its host computer in an automated fashion and without the intervention or assistance of employees of the lodging facility.

To the extent that no employees are involved, the check-in process may be faster, as the terminal machines will not be provided sick leave, taking breaks, answer telephones, or other activity which may prolong the check-in.

It is thus an advantageous effect of the present invention to provide a self service terminal for registering some arriving guests at a lodging facility including providing a key to the guest, without assistance from lodging facility employees. Of course, some guests may be unwilling or unable to use the terminals or present special problems (e.g., paying with foreign currency), so some lesser quantity of front desk labor at the lodging establishment probably will still be required.

In the disclosed embodiment, the system includes a sensor means for ascertaining that one and only one key is being provided to the customer during the check-in process. This sensor and its associated logic and control circuitry detects and corrects for machine failures should they occur.

It is a further advantageous effect of the present invention that the self service terminals described herein can accomplish the check-out of a departing guest from the lodging facility, including the recovery of his room key, with a reduced labor requirement for the lodging facility. As contemplated by the preferred embodiment, a plurality of room key stores are provided, each queue being associated with a different type of room in the lodging facility. Within each queue, the keys are provided in an order with a list of the room numbers in order available to the terminal. When an arriving guest selects his type of room, the next room of that time is then assigned to him and the key for that room is dispensed from the appropriate queue of keys.

Yet another advantageous effect of the present invention is that the automated check-in and check-out procedures are substantially automated, reducing labor cost for the lodging facility and the possibility for human mistake. Business travelers who know the check-in process can quickly check in without waiting for customers who may be unfamiliar with the check-in process, the town or the language, who deal with front desk personnel.

Other objects and advantages of the present invention will be apparent to those skilled in the art of data processing and administration of lodging facilities in view of the following detailed description of the drawings taken in conjunction with the appended claims and the accompanying drawings.

BEST MODE FOR CARRYING OUT THE INVENTION

Figure 1:
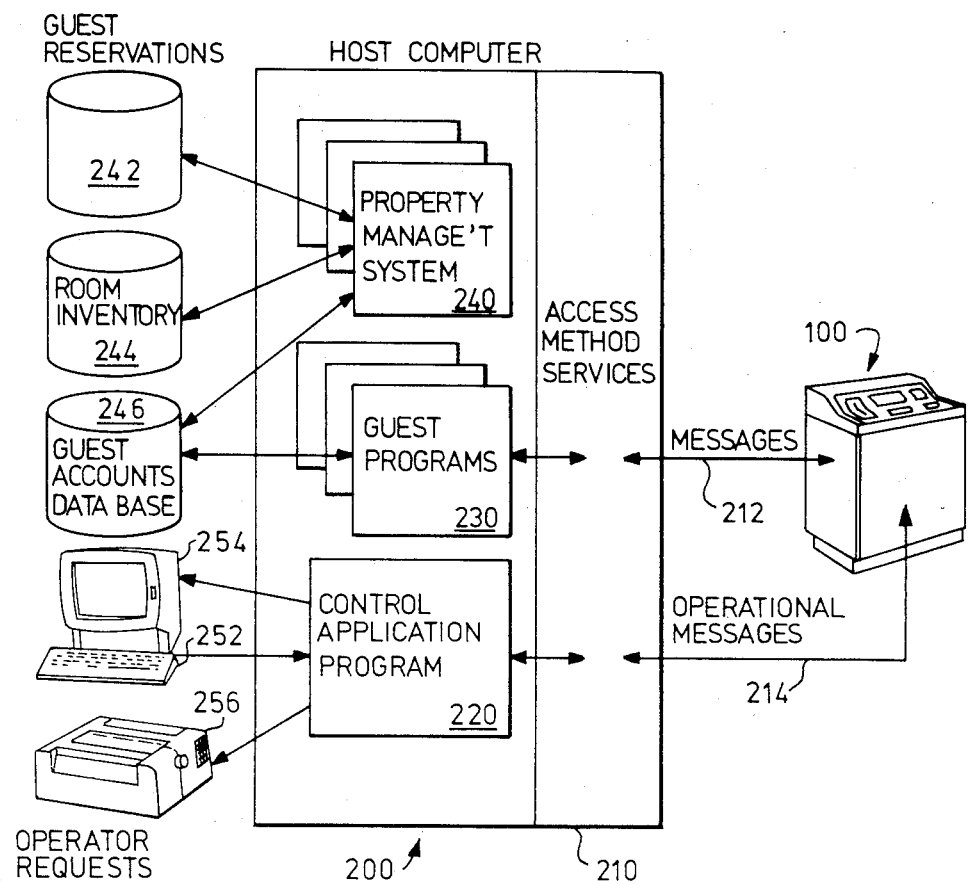
FIG. 1 is a block diagram of an information processing system including a self service terminal for the lodging industry in the context of the present invention.

As depicted in FIG. 1, the present invention is an information processing system 90 which includes a self service terminal or console 100 coupled to a central processor or host computer 200.

The host computer 200 communicates with the terminal 100 through an interface 210 and communication lines 212, 214, which may be conventional cables or may be telecommunications links, both of which are convention. Control instructions implementing logic such as described later in connection with FIGS. 3-5 and information (e.g., identifying the guest, his assigned room, his bill) passes between the terminal 100 and the host computer 200.

Resident within the host are software including a control and applications programs, 220 and guest programs 230 as well as a property management system 240. The property management system 240 includes data files representing guest reservations 242, room inventory 244 and guest accounts 246. As depicted in this view, the host computer 200 may be accessed directly, e.g., from the front desk, via a keyboard 252, a display 254 and a printer 256. In this manner, guests registering at the front desk through manual entry by personnel of the lodging facility may be integrated into the same system (host computer 200), and, in fact, the preferred logic of the teller permits the front desk to assign rooms which otherwise would be available through the self service terminal 100 of the present invention.

The host computer 200 in its preferred embodiment is an IBM Series 1 computer with suitable storage facilities, although other general purpose computers could be used to advantage.

Figure 2:
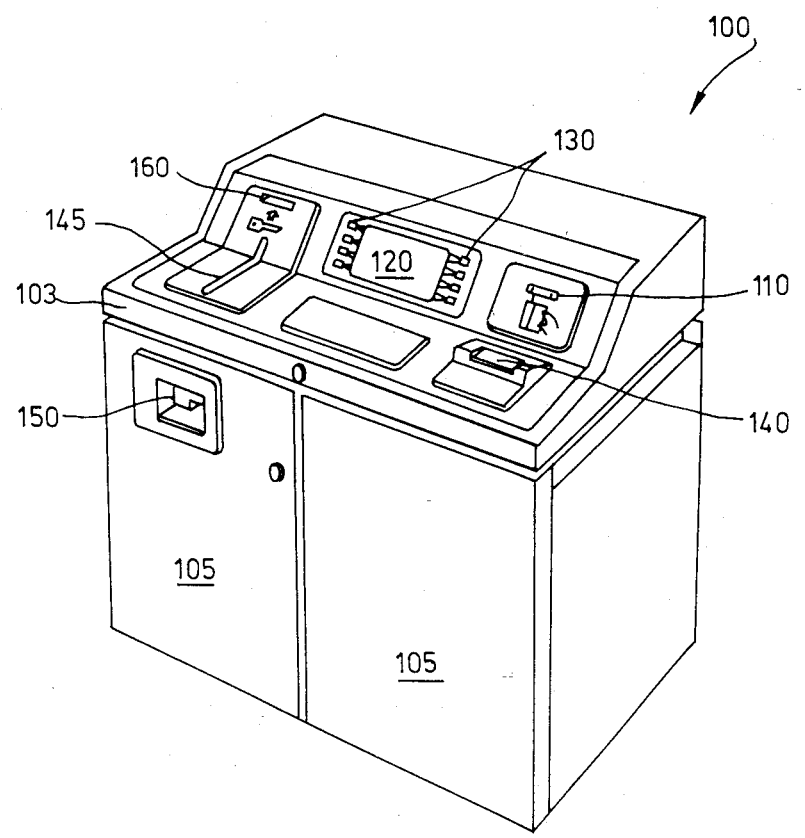
FIG. 2 is a perspective view of the self service terminal shown in FIG. 1, enlarged to show detail of its exterior.

As shown in FIG. 2, the terminal 100 includes a card reader 110, a display 120, a plurality of selection buttons 130 arranged around the periphery of display 120, printer output slots 140, 145 a key dispensing cup 150 and a key return slot 160.

The hardware elements associated with the card reader 110, the display 120, the selection buttons 130 and a printer which provides printed output at the printer output slot 140 are functionally similar to the hardware which is sold by International Business Machines Corporation as a "Personal Banking Machine, Model 4730". For further details regarding the structure, function, and operation of these items, a Users Manual for the IBM Model 4730 should be consulted, which Manual is hereby specifically incorporated herein by reference.

The terminal 100 has its operational equipment mounted in a cabinet upper and lower access doors 103, 105 across its front through which component parts may accessed for service or supply refill. These doors are normally closed and locked in the operating environment to prevent unauthorized personnel from tampering with or vandalizing the system.

The host 200 is coupled to the terminal 200 by appropriate communications or telecommunication facilities and may be a general purpose central processor such as the IBM Series I computer. Associated with the host 200 are reservation files 210, 220, 230.

Figure 4:
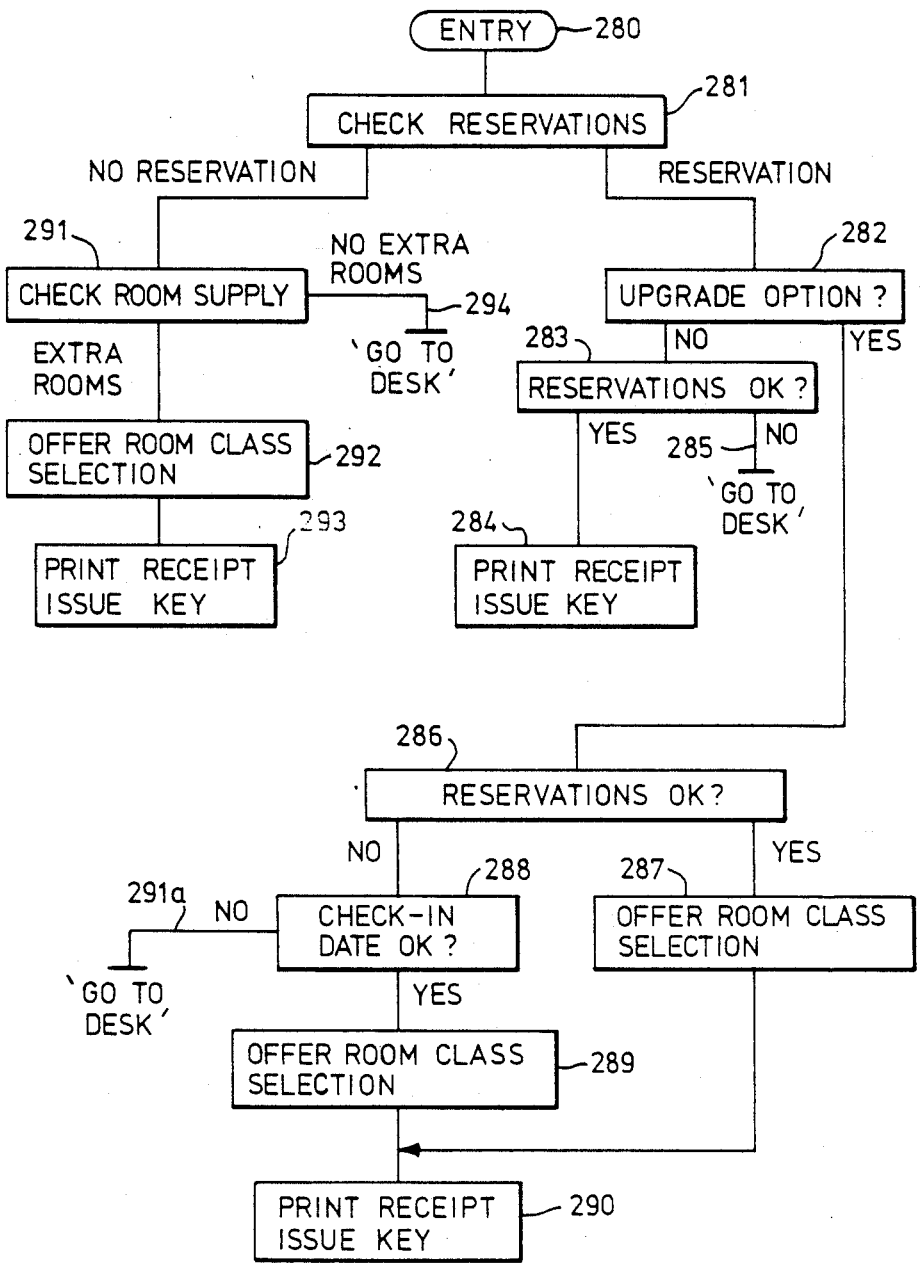
FIGS. 3-5 are block diagrams of logic used in the information processing system of FIG. 1.
Figure 3:
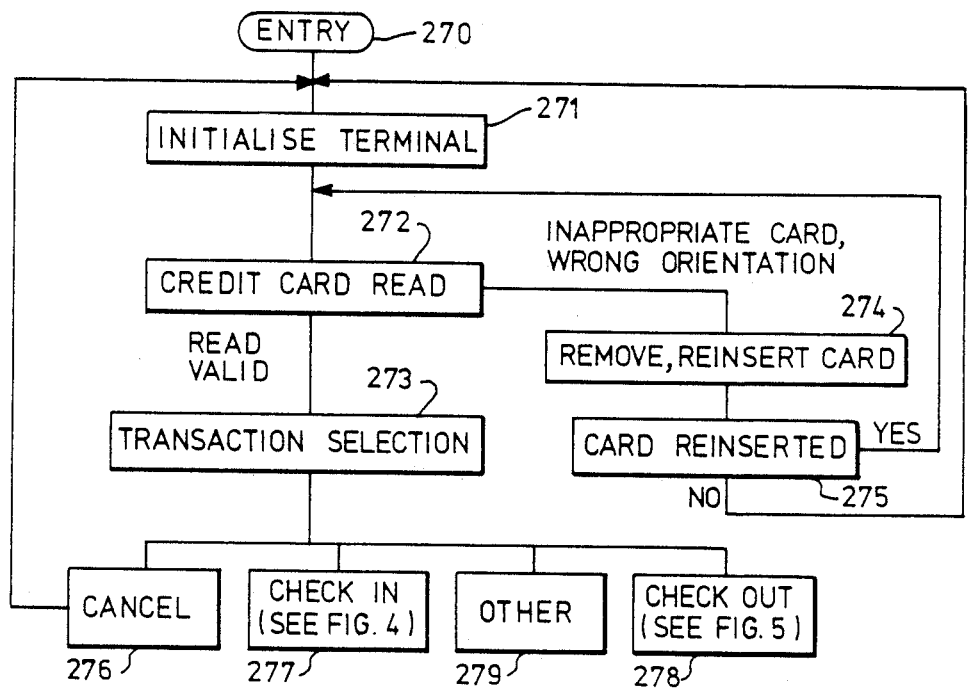
Figure 5:
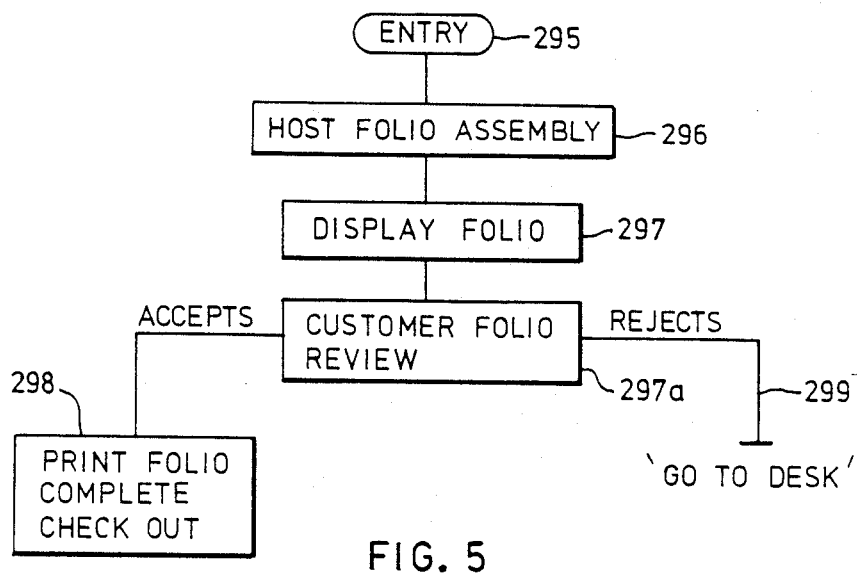

FIGS. 3–5 are block diagrams of the logic flow charts for the processing system used in the self service terminal for the lodging industry.

An illustrative logic for operation of the self service terminals 100 is shown in FIG. 3. From the entry 270, the terminal is initialized at block 271, which provides a display message greeting a guest and instructs him to insert his identification card into the card reader described in connection with FIG. 2. If the card is read, block 273 indicates that a menu of possible, transaction is then displayed for the guest's selection.

From reading the card, a guest's name, account number and/or credit card number can be read so that the host can determine whether the guest has reservations and, if desired, whether his credit card is valid.

If the card is not read, block 274 indicates a displayed message requesting the guest to remove and reinsert his card. If the card is reinserted at block 275, the system returns to block 272 to reread the card, otherwise it returns to block 271 (for the next guest.)

At the transaction selection, the guest may choose to cancel the transaction (at block 276), to check-in (at block 277, described in connection with FIG. 4), to check-out (at block 278), described in connection with FIG. 5) or to do some other supported function at block 279, such as checking his account or making a reservation, such other functions are straight forward data processing techniques which are publicly know, yet form no substantial part of the present invention and therefore, won't be discussed further.

The check-in function detailed in FIG. 4 proceeds from an entry block 280 to checking for a reservation at block 281. If the guest has a reservation (the host computer will determine its type) at block 282, he is offered an upgrade to a better or different type of room. If the guest declines the upgrade, control proceeds to block 283 where the guest is asked to confirm the details of the reservation. If he does, at block 284 the check-in confirmation is printed by printer associated with 140 (in FIG. 2). A key is then issued for a room of the type the guest reserved by removing the bottom key from the appropriate stack or queue of room keys associated with that of room. A room number is determined from memory of the host computer 200 which includes an ordered list of the room keys in each queue, and the guest's identity and his room number are then stored in memory advantageously of the host computer 200.

If the guest chooses to upgrade (or change) his reservation at block 282, the reservation is then confirmed at block 286, a room class or type selection occurs at block 287 and the receipt printed and key issued at block 290. If the reservation is not confirmed at block 286, the check-in date is checked at block 288, and the room class selection is offered at block 289 before reaching the block 290.

For a guest checking in without reservations, the supply of available rooms is checked at block 291. If rooms are available, the guest is offered a class selection at block 292 before the receipt is printed, key issued and host record. made at block 293 (like at the block 284.) If rooms are not available at line 294, or the reservation is not appropriate at line 285 or line 291, the guest is asked to proceed to the front desk by an appropriate message on the display.

FIG. 5 illustrates the check-out procedure, for a guest who chooses "check-out" as the transaction at the block 273. From an entry at block 295, the host proceeds to assemble the guest's folio, or statement of account, at block 296 which is then displayed at block 297 for the guest's review. At block 297a the guest indicates whether he accepts the folio. If so, the check-out is completed at block 298 with printing the folio, requesting return of his key through the key return slot shown and described in connection with FIG. 2 and updating the memory to show that the guest has returned his key and checked out. If the customer has questions about his statement or charges, at line 299 he receives a message to proceed to the front desk to receive personal attention.

Figure 6:
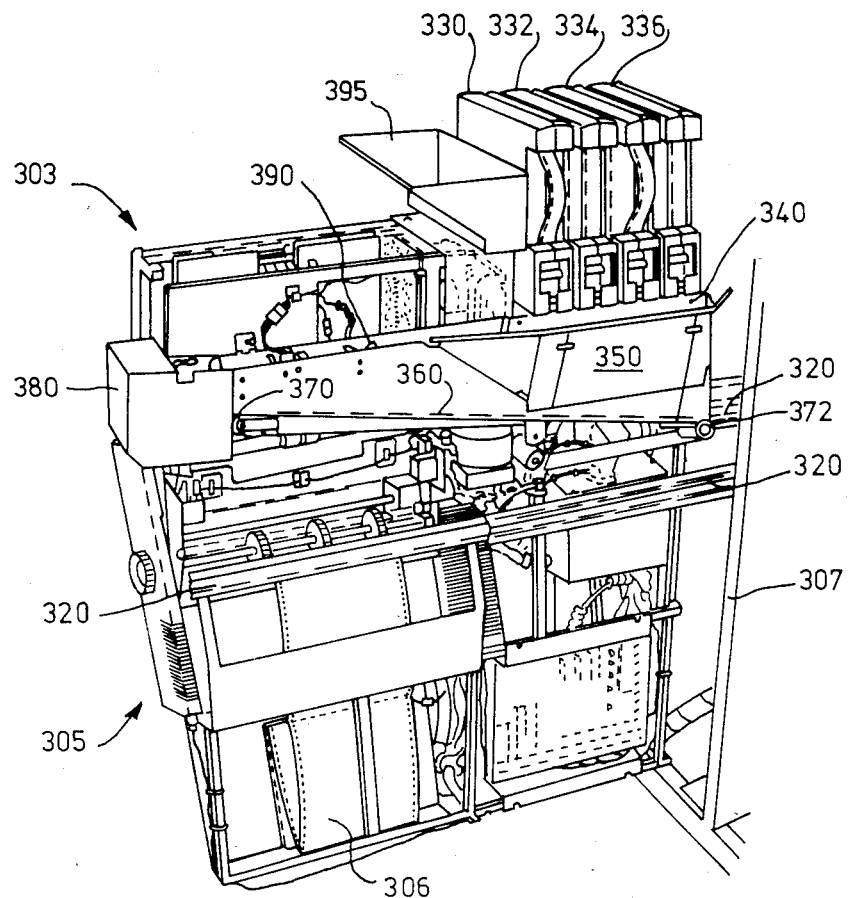
FIG. 6 is a perspective view of a key delivery system and folio printer used in the self service terminal of FIG. 2.

FIG. 6 shows a perspective view of a key delivery system 303 and a statement printer assembly 305 as used in the present invention. In normal operation of the terminal, both the key delivery system 303 and the statement printer assembly 305 are contained within the normally closed access doors of the cabinet (as shown in FIG. 2). For maintenance, the key delivery system 303 and the statement printer assembly 305 are mounted to a frame 307 of the cabinet on horizontal guides 320, only one of which is shown well in FIG. 3, with the other one behind the statement printer assembly. This view shows the key delivery system 303 and the printer assembly 305 in the service position, that is pulled out from the enclosure (not shown) for improved visibility of its parts.

As shown in this FIG. 6, the key delivery systems 303 includes a plurality of key cartridges 330, 332, 334, and 336 which are mounted to a frame 340. Spaced from a vertical wall of the frame 340 and extending generally parallel thereto, is a wall 350 which is laterally movable and forms a funnel-like channel for keys therebetween. Located between the frame 340 and the wall 350 is an endless drive belt 360 which is reaved over pulleys 370, 372 at opposite ends of the belt 360. One of said pulleys is selectively driven to move the top surface of the belt 360 from the region of the pulley 372 to the region of the pulley 370.

A key from a key cartridge, e.g. from the cartridge 330, is dropped from the cartridge 330 between the frame 340 and the wall 350 onto the top surface of the endless drive belt 360 for conveyance from the key cartridge 330 (which is located toward the rear portion of the terminal) to a key cup 380 mounted near the front surface of the terminal. The front surface is adjacent to, and therefor accessible by a customer using the terminal. As a key (not shown) is carried along the drive belt 360, it passes a sensor 390 which generates a signal indicative of the passage of a key on its journey from a key cartridge to the key cup 380 where a guest may acquire it.

A bin 395 is shown adjacent the key cartridge 330 for receiving keys being returned by guests as they check out. A departing guest places his key through the key return slot (160 as described and shown in connection with FIG. 2) with the bin 395 immediately under the slot when the self service terminal is assembled as shown in FIG. 2. For the convenience of the employees of the lodging facility, this bin 395 may be detached for ease in removing the returned keys.

As shown in FIG. 6, a printer 305, mounted upside down, is shown with a supply of continuous form paper 306 extending therethrough. This printer provides the folio or statement detailing the guest charges and includes a paper cutter for terminating the statement at a predetermined length which equals the amount of printing plus the preset margins on top and bottom of the statement. And this way, a guest of the lodging facility receives a statement which is commensurate with the activity in his account and not with the predetermined size of paper which the lodging facility has decided its folios would be. Such folio or statement of account is fed from the printer 305 through its platen and paper feed mechanism and auxiliary paper transports through the printer output slot 145 as shown and described in connection with FIG. 2.

Figure 7:
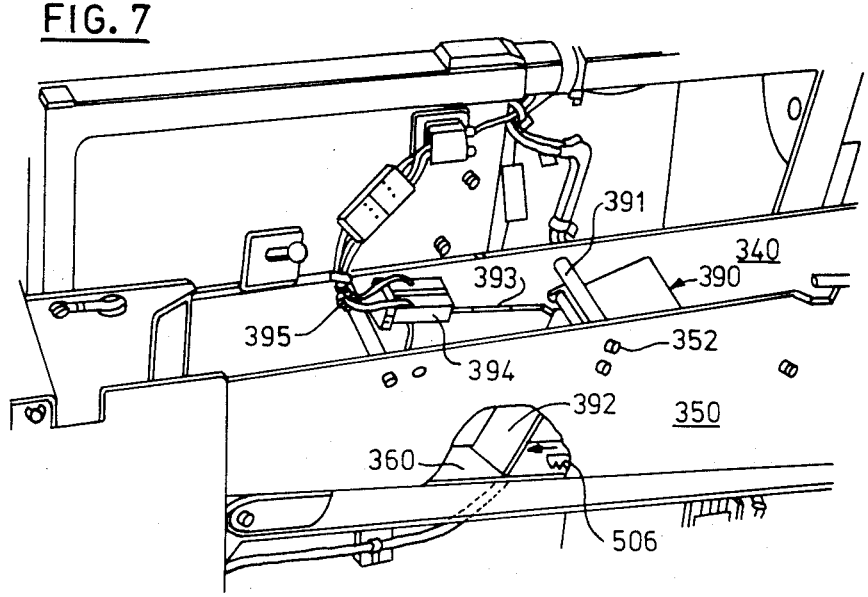
FIG. 7 is an enlarged perspective view, partially in cut away cross section, of a portion of FIG. 6 detailing elements of the key delivery system for the self service terminal.

FIG. 7 shows an enlarged perspective view partially broken away and cross-sectioned of a portion of FIG. 6 in the region of the sensor 390. The sensor 390 is mounted to the wall 350 by a screw 352 passing through a tubular member 391. The sensor 390 includes an actuator arm 392 which extends downwardly from the tubular member 391 to rest on the drive belt 360. Coupled to the upper portion of the actuator arm 392 is a rod 393 coupled to sensor 394 which provides an electrical output on line or wire 395 when the orientation of sensor 394 has been changed. Also shown in this FIG. 7 is a portion of a key 506 being carried along the belt 360 in the direction of the arrow. As the key 506 passes the actuator arm 392, it lifts the arm 392 by pivoting it about its connection to the tubular member 391, moving the rod 393 and causing the sensor 394 to provide an electrical signal indicating the presence of the key 506 by an electric signal on line 395. The actuator arm 392 returns to its position shown in FIG. 5 after the key 506 passes it, causing the signal on line 395 ceases, indicating that no key is passing.

Logic associated with the terminal (not shown) both triggers the mechanism to move a key from the cartridge and senses whether one and only one key has passed the sensor 390. If more than one key should pass the sensor, the keys are channeled to a reject station rather than to the key cup.

Figure 8:
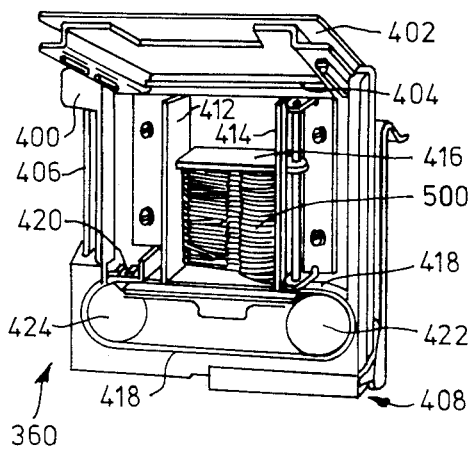
FIG. 8 is a perspective view, partially cut away in cross section, of a key cartridge used in the key delivery system of FIG. 6.

FIG. 8 shows a perspective view, partially cut away, of a key cartridge 330 as used in the present invention. The cartridge 330 includes a frame 400 and a cover 402 which is rotatably mounted on an axle 404 to allow the cover 402 to be lifted at the position shown in this FIG. 7 for loading and unloading keys. The cover 402 is closed for use in the operating environment of FIG. 3. The frame 400 of the cartridge includes a handle 406 and a base 408 which includes guides cooperating with projecting locator keys carried on the frame 340 of the key dispensing apparatus shown in FIG. 6.

Within the key cartridge 330 are adjustable guides 412, 414 which are generally parallel and spaced slightly farther apart than the length of the keys to be accommodated therebetween. A stack 500 of keys are shown stacked between the guides 412, 414 with a pressure plate 416 shown above the stack 500 of keys. The pressure plate 416 is parallel to the keys and mounted to move downward with dispensing of keys and providing a downward retaining force on the stack of keys. Below the stack 500 of keys is a key feed belt 418 which includes a plurality of cogs or teeth 420 extending across the width of the belt and generally extending above the belt by a height approximating the height of a key. The key feed belt 418 includes a region somewhat longer than the length of a key in which the teeth 420 do not exist, thereby allowing the belt to remove a single key from the stack during the passage of that portion of the key feed belt 418. The key feed belt 418 passes over rollers 422, 424, at least one of which is selectively powered in order to deliver a single key from the stack 500 of keys to a discharge port at the base of the cartridge.

Figure 9:
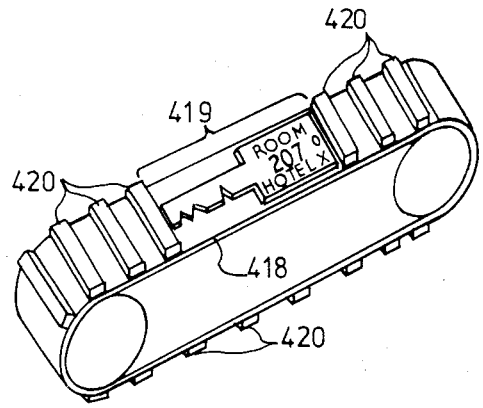
FIG. 9 is an enlarged view of a key feed belt used in the key cartridge of FIG. 8.

FIG. 9 shows an enlarged view of the key feed belt 418 which was described and shown in connection with FIG. 8. As shown in this view, the key feed belt 418 includes upwardly projecting cogs 420 and a region 419 in which there are no cogs to allow the key to be received therein. Accordingly, the region 419 without cogs serves as a region in which keys may be removed from the stack and the region having cogs then provides a region of the belt in which keys are not removed from the stack when the cogs pass under the stack of keys.

Rather than dispensing a loose key, one or more keys may be enclosed in a box or carrier for ease in handling or dispensing.

Of course, many modifications to the present invention will be apparent to those skilled in the art of data processing and to those skilled in the art of administration of lodging units. Further, the use of some features of this invention may be advantageous without the corresponding use of other features. For example, the present invention has been described in its best mode, in connection with metallic or brass keys which are reusable and which would be recaptured upon checkout. Other types of keys are presently known today for hotel applications, for instance, computer generated keys or punched keys and still others might exist in the future such as magnetic stripe keys. Rather than maintaining a stock of keys as has been described in the brass key example, the apparatus might create the key from appropriate stock on demand, or might encrypt the appropriate digital magnetic "key" on the magnetic stripe of the guest's credit card. Accordingly, some systems have keys which either need not be recovered. Further, some lodging facilities having other techniques for recovering their room keys, such as having guests leave the keys in the room. While the present description has been directed to a lodging facility, there are some other applications which are analogous and for which only minor changes to the design would be required. For example, other facilities providing temporary access by key such as car rentals, equipment rentals, etc. may use the apparatus and methods disclosed herein to advantage. Accordingly, the foregoing description of the best mode for carrying out the present invention should be considered as merely illustrative of the principles of the present invention and not in limitation thereof. The present invention accordingly, is defined solely by the claims which follow.

Having thus described the invention, what is claimed is:

1. A method for registering a guest checking into a lodging facility having a terminal and a memory associated therewith comprising the steps of:
   storing in the terminal, a plurality of keys, each key being associated uniquely with a room in said lodging facility;
   identifying said guest from an input to the terminal;
   determining the type of lodging requested by said guest;
   determining whether a room of the type requested by said guest is available for assignment, and if so, asssigning a room by number to said guest including the step of recording in the memory available to said terminal a record of said room number associated with the guest's identity; and dispensing to the guest a key for the room assigned to said guest.

2. A method of registering a guest in a lodging facility including the steps described in claim 1, wherein said method further includes the steps of:

generating a printed verification of the registration for said guest;

and providing the printed verification to said guest.

3. The method of claim 1 for checking a guest out of a lodging facility further comprising the steps of:

presenting on a display a listing of said guest's charges from memory for said guest's approval;

printing a copy of said guest's charges;

collecting the key from said guest at a key receptable location; and updating memory to record that said guest has checked out from the lodging facility after the key has been collected from said guest.

4. A self service terminal for use by a guest in checking into a lodging facility, the terminal having an identification card reader for determining the identity of a guest, a display, a keyboard for communicating with a guest, a printer, and a computer coupled to said card reader, display, keyboard and printer, said computer including means for assigning a room to a guest upon check-in, the improvement comprising:

means for ascertaining a guest's choice of room features and for assigning a room associated with that choice;

a plurality of key storage sections, each key storage section including a plurality of keys each key in a given storage section being to a different feature of the rooms;

means for automatically dispensing to a said guest, a key associated uniquely with the room assigned to said guest by the computer in reponse to communication with said computer.

5. A self service terminal of the type described in claim 4, wherein one section of the key storage includes keys for rooms having double beds.

6. A self service terminal of the type described in claim 4, wherein said terminal further includes key receiving means for recovering keys of guests as they check out of the lodging facility using the self service terminal.

7. A self service terminal for registering a guest checking into a lodging facility, said terminal being controlled by a computer and a memory associated therewith, said terminal comprising:

means for storing a plurality of keys, each key being associated uniquely with a room in said lodging facility;

means connected to said computer for reading an identification card submitted by said guest;

means connected to said computer by which said guest requests the type of lodging desired by said guest;

a program in said computer for determining whether a room of the type requested by said guest is available for assignment and, if so, assigning a room by number to said guest and recording in said memory a record of said room number associated with said guest's identity; and means connected to said computer and to said means for storing to dispense to said guest a key for said room assigned to said guest.

8. The self service terminal of claim 7 further comprising:

means for displaying to said guest, verification of the registration for said guest; and means for printing and providing said verification to said guest.

9. The self service terminal of claim 8 comprising:

means for presenting on the display a listing of said guest's charges from memory for said guest's approval;

means for printing a copy of the guest's charges;

means connected to said computer for collecting said key from said guest before updating said memory to record that said guest has checked out from the lodging facility.

10. A self service terminal for issuing a key to a person who desires to use a locked facility, said terminal being controlled by a computer and a memory associated therewith, said terminal comprising:

means for storing a plurality of said keys in a predetermined arrangement, each key being associated uniquely with a facility, a record of said arrangement being stored in said memory;

means connected to said computer for reading an identification card submitted by said person;

means connected to said computer by which said person requests a type of facility desired;

a program in said computer for determining whether a facility of the type requested by said person is available for assignment and, if so, assigning a facility to said person and recording in said memory a record of said facility associated with said person's identity; and means connected to said computer and to said means for storing to dispense to said person a key for said facility assigned to said person.

11. The self service terminal of claim 10 further comprising:

means for displaying to said person, verification of the registration for said person; and means for printing and providing to said person, a document representing said assignment.

* * * * *

UNITED STATES PATENT AND TRADEMARK OFFICE
CERTIFICATE OF CORRECTION

PATENT NO. : 4,752,876

DATED : June 21, 1988

INVENTOR(S) : Wilfred R. Couch, Russell G. Burgess

It is certified that error appears in the above-identified patent and that said Letters Patent is hereby corrected as shown below:

In the Abstract, line 10, please change --intervention-- to without intervention.

In Claim 3, col. 9, line 18: Change --receptable-- to receptacle.

Signed and Sealed this

Twenty-seventh Day of June, 1989

Attest:

DONALD J. QUIGG

Attesting Officer

Commissioner of Patents and Trademarks